United States Patent
Basavarajappa et al.

(10) Patent No.: US 11,734,096 B2
(45) Date of Patent: Aug. 22, 2023

(54) DISASTER PREDICTION RECOVERY: STATISTICAL CONTENT BASED FILTER FOR SOFTWARE AS A SERVICE

(71) Applicant: VMWARE, INC., Palo Alto, CA (US)

(72) Inventors: Chethana Hebbal Basavarajappa, Bangalore (IN); Amita Ranjan, Bangalore (IN); Kavya Reddy Musani, Austin, TX (US)

(73) Assignee: VMWARE, INC., Palo Alto, CA (US)

( * ) Notice: Subject to any disclaimer, the term of this patent is extended or adjusted under 35 U.S.C. 154(b) by 1560 days.

(21) Appl. No.: 15/889,246

(22) Filed: Feb. 6, 2018

(65) Prior Publication Data
US 2019/0122130 A1    Apr. 25, 2019

(30) Foreign Application Priority Data
Oct. 23, 2017    (IN) .............................. 201741037410

(51) Int. Cl.
*G06F 11/00* (2006.01)
*G06F 11/07* (2006.01)
*G06N 5/047* (2023.01)
*G06F 11/22* (2006.01)

(52) U.S. Cl.
CPC ........ *G06F 11/079* (2013.01); *G06F 11/0706* (2013.01); *G06F 11/0751* (2013.01); *G06F 11/0778* (2013.01); *G06F 11/0787* (2013.01); *G06F 11/2263* (2013.01); *G06N 5/047* (2013.01)

(58) Field of Classification Search
CPC ............. G06F 11/0703; G06F 11/0706; G06F 11/0751; G06F 11/0778; G06F 11/0787; G06F 79/2263; G06F 40/279; G06F 40/284; G06F 40/289; G06F 40/295; G06F 11/079; G06F 11/2263; G06N 5/02; G06N 5/047; G06K 9/6218
See application file for complete search history.

(56) References Cited

U.S. PATENT DOCUMENTS

| | | | | |
|---|---|---|---|---|
| 8,666,984 | B2 * | 3/2014 | Kim | G06F 40/30 |
| | | | | 707/737 |
| 9,323,826 | B2 * | 4/2016 | Bailey | G06F 16/95 |
| 9,542,255 | B2 * | 1/2017 | Fu | G06F 11/0724 |
| 10,275,496 | B2 * | 4/2019 | Brew | G06F 11/30 |

(Continued)

OTHER PUBLICATIONS

Q. Lin, H. Zhang, Jian-Guang Lou, Y. Zhang and X. Chen, "Log Clustering Based Problem Identification for Online Service Systems," 2016 IEEE/ACM 38th International Conference on Software Engineering Companion (ICSE-C), Austin, TX, USA, 2016, pp. 102-111. (Year: 2016).*

*Primary Examiner* — Anthony J Amoroso
(74) *Attorney, Agent, or Firm* — Su IP Consulting

(57) ABSTRACT

A method is provided to predict a disaster for a computer system based on logs. The method includes representing existing logs as first vectors by tokenizing the existing logs and partitioning the first vectors into clusters. The clusters represent disaster types. The method further includes selecting representative vectors for the clusters, representing a new log of the computer system as a second vector by tokenizing the new log, matching the second vector to a cluster by comparing the second vector and the representative vectors, and categorizing the new log as a disaster type represented by the cluster.

15 Claims, 2 Drawing Sheets

(56) References Cited

U.S. PATENT DOCUMENTS

| | | | |
|---|---|---|---|
| 10,423,624 B2* | 9/2019 | Simhon | G06F 16/24558 |
| 11,194,692 B2* | 12/2021 | Xu | G06F 17/18 |
| 2014/0334739 A1* | 11/2014 | Umanesan | G06V 30/1983 |
| | | | 382/200 |
| 2015/0089309 A1* | 3/2015 | Fu | G06F 11/0724 |
| | | | 714/57 |
| 2017/0293543 A1* | 10/2017 | Xu | G06F 11/008 |
| 2018/0102938 A1* | 4/2018 | Yoon | G06F 16/358 |

* cited by examiner

DISASTER PREDICTION RECOVERY: STATISTICAL CONTENT BASED FILTER FOR SOFTWARE AS A SERVICE

CROSS-REFERENCE TO RELATED APPLICATION

Benefit is claimed under 35 U.S.C. 119(a)-(d) to Foreign Application Serial No. 201741037410 filed in India entitled "DISASTER PREDICTION RECOVERY: STATISTICAL CONTENT BASED FILTER FOR SOFTWARE AS A SERVICE", on Oct. 23, 2017, by VMware, Inc., which is herein incorporated in its entirety by reference for all purposes.

BACKGROUND

Failures are a part of information technology (IT) environments. Common causes of failures include natural disasters, network outages, power outages, hardware failures, and software failures. IT organizations implement disaster recovery plans to reduce downtime and determine the causes of failures.

DETAILED DESCRIPTION

Figure 1:
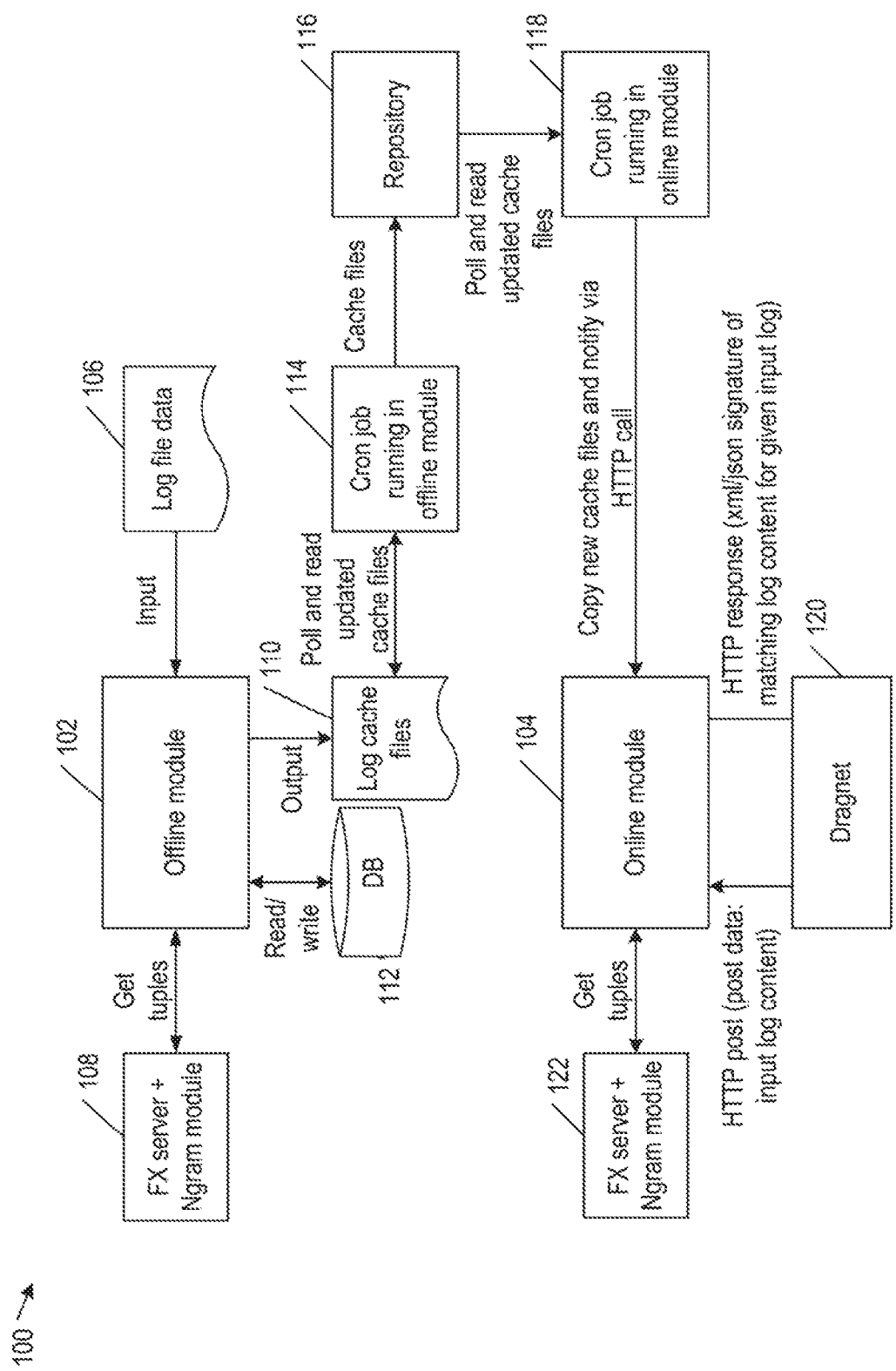
FIG. 1 is a block diagram of a disaster prediction system in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

A common way to determine the cause of a failure in a computer system is scanning the logs generated by the system. Brute force methods are tried and tested technique to determine the cause of a failure. However, keyword driven methods specific to a targeted system may provide better results. Using the existing learning set of keywords adds another dynamic angle to the process. Hence, data science and machine learning concepts enhances disaster recovery for software as a service (SAAS) model in today's fast-paced cloud application delivery systems.

Analyzing large amounts of dynamic incoming data becomes a daunting task in real time. SAAS environments generate logs in huge volumes and filtering them for the required data is not a simple task. While there are various ways to process the logs, finding a statistically fine-tuned method that is accurate and precise needs in-depth analysis of the present and previous failures.

In examples of the present disclosure, logs are categorized as disasters by machine learning using a token matching technique. For existing logs, an offline module represents each log as a vector of tokens. The offline module groups the existing logs into clusters based on similarity where each cluster represents a different disaster type. The offline module may assign pre-defined recovery solutions for various disaster failure types. An online module represents a new log as a vector of tokens and categories the new log as a disaster type based on similarity of the new log and the clusters. The online module may apply the pre-defined recovery solution assigned to the matching cluster.

FIG. 1 is a block diagram of a disaster prediction system 100 in examples of the present disclosure. System 100 includes an offline module 102 and an online module 104. Offline module 102 and online module 104 may be located at different sites and connected by a network. Online module 104 may be located at the same site as a computer system protected by system 100, or integrated as part of such a computer system.

Offline module 102 receives log files 106. For each log file 106, offline module 102 uses an n-gram module 108 to tokenize the log file into a vector of tokens and their frequencies, and calculate the number of unique tokens in the vector. In such a vector, each token is a dimension of the vector and consists of one or more words. For a set of log files 106, offline module 102 partitions the vectors into clusters. Offline module 102 may use k-means clustering to partition the vectors. Each cluster is assigned a disaster type and a recovery plan. For each cluster, offline module 102 selects the vector closest to the center of the cluster as the representative vector. For each log file 106, offline module 102 stores its vector, number of overlapping tokens, and cluster ID as a tuple in log cache file 110 in a database 112. For each representative vector, offline module 102 also stores an indicator in its tuple.

Offline module 102 includes a job scheduler (e.g., a cron job) 114 that periodically polls database 112 to see if log cache file 110 has been updated. If so, job scheduler 114 reads and writes log cache file 110 to a repository 116 that is accessible by online module 104.

Online module 104 includes a job scheduler (e.g., a cron job) 118 that periodically polls repository 116 to see if log cache file 110 has been updated. If so, job scheduler 118 copies log cache file 110 to local memory and notifies online module 102 (e.g., via a HTTP call).

Online module 104 receives a new log file from a logger 120 of a computer system. Logger 120 may post the new log file to online module 104 as the logger generates the log file in real-time or after the logger saves the log file. Online module 104 uses an n-gram module 122 to tokenize the new log file into a vector of tokens and their frequencies, and calculate the number of unique tokens in the vector. Online module 104 matches the vector of the new log file against representative vectors for the clusters in log cache file 110 and categorizes the new log file as a disaster type of the best-matched cluster. Online module 104 then sends the disaster type and an assigned recovery plan for the disaster type back to logger 120, which may then initiate the recovery plan for the computer system.

Figure 2:
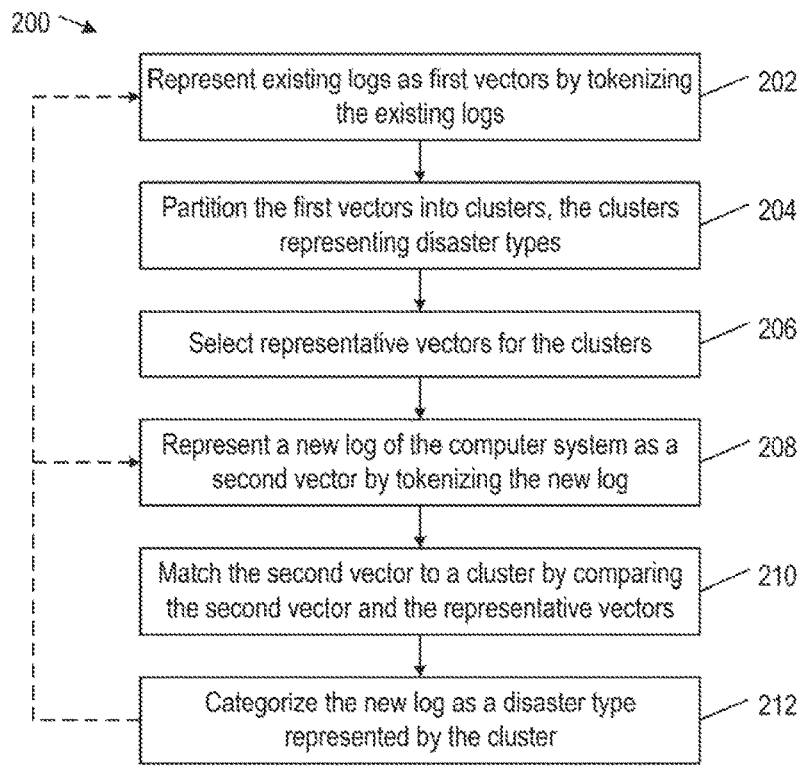
FIG. 2 is a block diagram of a method for the system of FIG. 1 to predict a disaster for a computer system based on logs in examples of the present disclosure.

FIG. 2 is a block diagram of a method 200 for system 100 (FIG. 1) to predict a disaster for a computer system based on logs in examples of the present disclosure. Method 200, and any method described herein, may be implemented as instructions encoded on a computer-readable medium that is to be executed by one or more processors in a computer system. Method 200, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 200 may begin in block 202

In block 202, offline module 102 uses n-gram module 108 to represent each existing log 106 as a vector by tokenizing the log. For example, offline module 102 divides the text in an existing log 106 into tokens of size three (3) words and determines their frequencies. Offline module 102 also uses n-gram module 108 to calculate the number of unique tokens of each vector. Block 202 may be followed by block 204.

In block 204, offline module 102 partitions the vectors generated in block 202 into clusters. For example, offline module 102 uses a k-mean clustering algorithm to partition the vectors into k clusters. In k-mean clustering, k number of centers is arbitrarily chosen, each vector is assigned to the closest (most similar) center, and the process is reiterated for a number of times. Cosine distance may be used to determine distance or similarity between vectors. Offline module 102 assigns a disaster type to each cluster. Offline module 102 may also assign a recovery plan to each cluster. For example, a human expert causes offline module 102 to assign the disaster types and the recovery plans to the clusters. The human expert may also reassign the vectors in the clusters to better correspond to the disaster types. Block 204 may be followed by block 206.

In block 206, offline module 102 selects a representative vector for each cluster. The human expert may change the representative vectors for the clusters. The representative vector of a cluster is the closest (most similar) vector to the center of the cluster. For each log, offline module 102 saves its vector, number of unique tokens, cluster ID as a tuple in log cache file 110 in a database 112. For each representative vector, offline module 102 also saves an indicator in its tuple. Block 206 may be followed by block 208.

In block 208, online module 104 uses n-gram module 122 to represent a new log as a vector by tokenizing the log. For example, online module 104 divides the text in the new log into tokens of size three (3) words and determines their frequencies. Online module 104 also uses n-gram module 122 to calculate the number of unique tokens of the vector. Block 208 may be followed by block 210.

In block 210, online module 104 matches the vector of the new log to a cluster by comparing the vector against the representative vectors of the clusters. Details of block 210 are explained later in reference to FIG. 3. Block 210 may be followed by block 212.

In block 212, online module 104 categorizes the new log as a disaster type of the best matched cluster. Online module 104 may send a XML or JSON file identifying the disaster type to logger 120. Block 212 optionally loops back to block 202 to process additional existing logs or to block 208 new logs.

Figure 3:
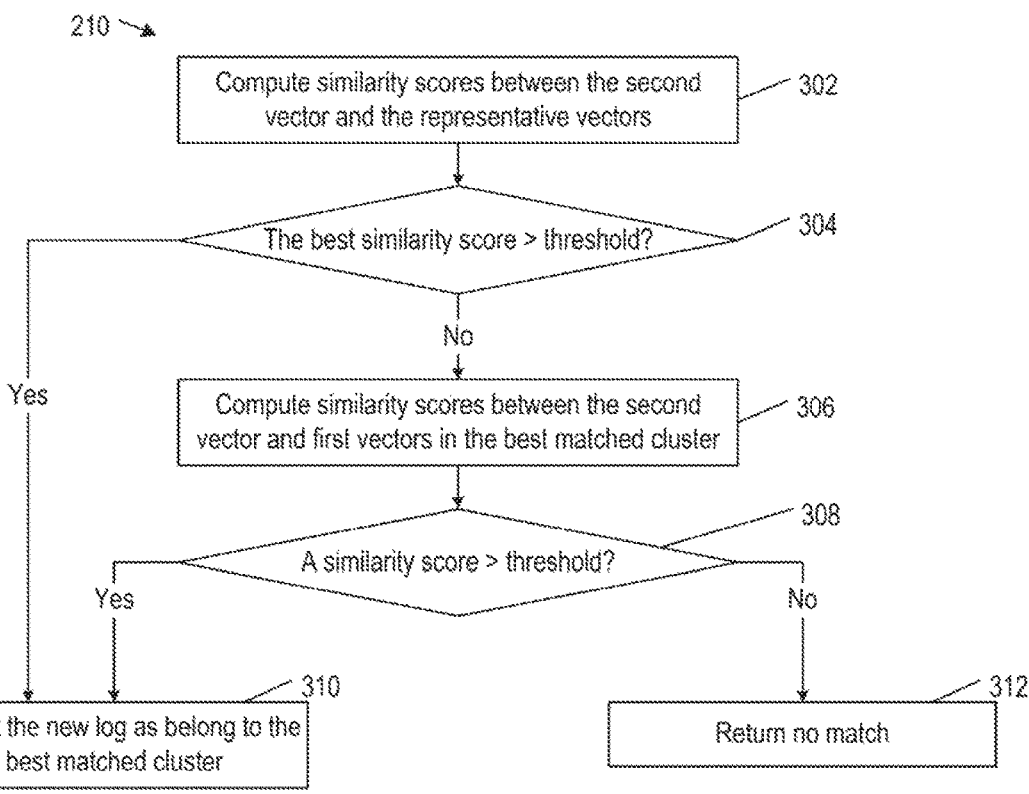
FIG. 3 is a block diagram illustrating the details of a block from the method of FIG. 2 in examples of the present disclosure.

FIG. 3 is a block diagram illustrating the details of block 210 from method 200 in examples of the present disclosure. Block 210 may begin in sub-block 302.

In sub-block 302, online module 104 computes similarity scores between the vector of the new log and the representative vectors of the clusters. The similarity score may be the cosine distance. Sub-block 302 may be followed by sub-block 304.

In sub-block 304, online module 104 determines if the best similarity score computed in sub-block 302 is greater than a threshold. If so, sub-block 304 may be followed by sub-block 310. Otherwise, sub-block 304 may be followed by sub-block 306. By providing this threshold, false-positives are reduced. The threshold values may be predefined or be adjusted based on the number of clusters and the amount of data in the vector space. A predefined threshold may be 0.75.

In sub-block 306, online module 104 computes similarity scores between the vector of the new log and the vectors in the best matched cluster. The similarity score may be computed using easy signature. The easy signature may be the ratio between the number of overlapping unique tokens between two logs and the total number of unique tokens in the two logs.

Easy score=# overlapping unique tokens/(# of unique tokens in log 1+# of unique tokens in log 2)

Overlapping tokens may be two tokens that at least partially overlap or identical.

Alternatively, cosine distance is used for the similarity score. Sub-block 306 may be followed by sub-block 308.

In sub-block 308, online module 104 determines if any similarity score for the vectors in the best matched cluster is greater than the threshold. If so, sub-block 308 may be followed by sub-block 310. Otherwise, sub-block 308 may be followed by block 312. The threshold values may be predefined or be adjusted based on the number of clusters and the amount of data in the vector space. A predefined threshold may be 0.35.

In sub-block 310, online module 104 concludes the new log belongs to the best matched cluster and categories the new log as the disaster type of the best matched cluster.

In sub-block 312, online module 104 concludes the new log does not belong to any of the clusters.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to predict a disaster for a computer system based on logs, the method comprising:
representing existing logs as first vectors by tokenizing the existing logs;
partitioning the first vectors into clusters, the clusters representing disaster types;
selecting representative vectors for the clusters;
representing a new log of the computer system as a second vector by tokenizing the new log;
matching the second vector to a cluster by comparing the second vector and the representative vectors; and
categorizing the new log as a disaster type represented by the cluster,
wherein matching the second vector to the cluster by comparing the second vector and the representative vectors comprises:
computing similarity scores between the second vector and the representative vectors;
determining if a highest similarity score is greater than a threshold, the highest similarity score being between the second vector and a representative vector of the cluster;

wherein when the highest similarity score is not greater than the threshold:
computing additional similarity scores between the second vector and first vectors in the cluster; and
when an additional similarity score is greater than the threshold, concluding the second vector matches the cluster.

2. The method of claim 1, wherein matching the second vector to the cluster by comparing the second vector and the representative vectors further comprises:
when the highest similarity score is greater than the threshold, concluding the second vector matches the cluster.

3. The method of claim 1, wherein a similarity score is a ratio between a number of overlapping unique tokens between two vectors and a total number of unique vectors in the two vectors.

4. The method of claim 1, wherein a similarity score is a cosine distance between vectors.

5. The method of claim 1, further comprising:
assigning recovery solutions for the clusters; and
applying a recovery solution for the cluster to the computer system.

6. A non-transitory, computer-readable storage medium encoded with instructions executable by a processor to predict a disaster for a computer system based on logs, the instructions comprising:
representing existing logs as first vectors by tokenizing the existing logs;
partitioning the first vectors into clusters, the clusters representing disaster types;
selecting representative vectors for the clusters;
representing a new log of the computer system as a second vector by tokenizing the new log;
matching the second vector to a cluster by comparing the second vector and the representative vectors; and
categorizing the new log as a disaster type represented by the cluster,
wherein matching the second vector to the cluster by comparing the second vector and the representative vectors comprises:
computing similarity scores between the second vector and the representative vectors;
determining if a highest similarity score is greater than a threshold, the highest similarity score being between the second vector and a representative vector of the cluster;
wherein when the highest similarity score is not greater than the threshold:
computing additional similarity scores between the second vector and first vectors in the cluster; and
when an additional similarity score is greater than the threshold, concluding the second vector matches the cluster.

7. The medium of claim 6, wherein matching the second vector to the cluster by comparing the second vector and the representative vectors further comprises:
when the highest similarity score is greater than the threshold, concluding the second vector matches the cluster.

8. The medium of claim 6, wherein a similarity score is a ratio between a number of overlapping unique tokens between two vectors and a total number of unique vectors in the two vectors.

9. The medium of claim 6, wherein a similarity score is a cosine distance between vectors.

10. The medium of claim 6, wherein the instructions further comprise:
assigning recovery solutions for the clusters; and
applying a recovery solution for the cluster to the computer system.

11. A system to predict a disaster based on logs, the system comprising:
one or more processors, wherein the one or more processors is configured to:
represent existing logs as first vectors by tokenizing the existing logs;
partition the first vectors into clusters, the clusters representing disaster types; and
select representative vectors for the clusters; and
wherein the one or more processors is configured to:
represent a new log of the computer system as a second vector by tokenizing the new log;
match the second vector to a cluster by comparing the second vector and the representative vectors; and
categorize the new log as a disaster type represented by the cluster,
wherein the one or more processors matches the second vector to the cluster by:
computing similarity scores between the second vector and the representative vectors;
determining if a highest similarity score is greater than a threshold, the highest similarity score being between the second vector and a representative vector of the cluster;
wherein when the highest similarity score is not greater than the threshold, the one or more processors is configured to:
compute additional similarity scores between the second vector and first vectors in the cluster; and
when an additional similarity score is greater than the threshold, conclude the second vector matches the cluster.

12. The system of claim 11, wherein the one or more processors matches the second vector to the cluster by:
when the highest similarity score is greater than the threshold, concluding the second vector matches the cluster.

13. The system of claim 11, wherein a similarity score is a ratio between a number of overlapping unique tokens between two vectors and a total number of unique vectors in the two vectors.

14. The system of claim 11, wherein a similarity score is a cosine distance between vectors.

15. The system of claim 11, wherein the one or more processors is further configured to assign recovery solutions for the clusters, and the one or more processors is further configured to apply a recovery solution for the cluster.

* * * * *